(12) United States Patent
Ooki

(10) Patent No.: US 6,400,502 B1
(45) Date of Patent: Jun. 4, 2002

(54) MICROSCOPE

(75) Inventor: Hiroshi Ooki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/375,385

(22) Filed: Aug. 17, 1999

(30) Foreign Application Priority Data

| Aug. 18, 1998 | (JP) | 10-247847 |
| Aug. 18, 1998 | (JP) | 10-247849 |
| Aug. 18, 1998 | (JP) | 10-247850 |
| Aug. 18, 1998 | (JP) | 10-247851 |

(51) Int. Cl.$^7$ .................. G02B 21/06; G02B 21/36; G02B 21/26
(52) U.S. Cl. .................. 359/388; 359/369; 359/385; 359/391
(58) Field of Search ............ 250/201.3; 359/388, 359/385, 386, 387, 389, 390, 391, 392, 393, 369, 363, 357, 368

(56) References Cited

U.S. PATENT DOCUMENTS

| 4,897,537 A | * | 1/1990 | Miyamoto et al. | 250/201.3 |
| 5,481,401 A | * | 1/1996 | Kita et al. | 359/363 |
| 5,703,714 A | * | 12/1997 | Kojima | 359/388 |
| 6,134,009 A | * | 10/2000 | Zavilsan | 359/369 |

* cited by examiner

Primary Examiner—Cassandra Spyrou
Assistant Examiner—Jennifer Winstedt

(57) ABSTRACT

A microscope having little damage such as deformation, discoloration or the like given to a sample is disclosed. This microscope comprises an illuminance reducing unit for reducing illuminance of an illumination light on the sample. Assuming that a time width where illuminance is at a level enough for displaying an image of the sample is $T_F$, a time width where illuminance is lower than the level enough for displaying an image of the sample is $T_N$, and a value $\alpha$ is as follows:

$$\alpha = T_F/(T_F+T_N)$$

the value $\alpha$ is changed according to a velocity of a stage or the like. A monitor displays a still picture of the sample for a period of $T_N$, the still picture being one before the time width $T_N$.

16 Claims, 8 Drawing Sheets

MICROSCOPE

This application claims the benefits of Japanese Application Nos. 10-247847, 10-247849, 10-247850 and 10-247851, which are hereby incorporated by reference.

BACKGROUND OF THE INVENTION

1. Field of the Invention

The present invention relates to a microscope such as an industrial microscope or the like.

2. Related Background Art

With an increased demand for optical microscopes of high resolving power in recent years, shortening of a wavelength to be used has progressed.

Constitution of a conventional microscope is simply explained as follows. An illumination light emitted from a light source is transmitted through an illuminating lens, and then made incident on a half mirror. A part of the illumination light made incident on the half mirror, which has been reflected by the half mirror, is transmitted through an objective lens to illuminate a sample placed on a stage. Assuming that a direction of an optical axis is Z and two directions orthogonal to each other on a plane are X and Y, the plane being orthogonal to the Z direction, the stage can be moved in the X, Y and Z directions by a stage driving system.

An observed light reflected on the sample is transmitted through the objective lens, and then made incident on the half mirror. After having passed through the half mirror, the observed light is transmitted through an image-forming lens to form an image on an image sensor. An output signal from the image sensor is converted into a video signal by a video signal processing circuit, and then transferred to a monitor. Thus, an image of the sample is displayed on the monitor.

In such a conventional microscope, when an observer watched the image of the sample placed nearly in a static state for a long time, the sample was continuously irradiated with illumination lights, and damage such as deformation, discoloration or the like occurred in the sample. The damage can be attributed to a gradual increase in energy of a light projected to the sample. Such a phenomenon was especially conspicuous in a laser-scanning microscope for converging illumination lights in a very small spot.

Light energy on the sample, i.e., a quantity of an illumination light to be projected, can be obtained by a product of illuminance and irradiation time. A damage degree of the sample has a correlation with this quantity of the illumination light to be projected. In other words, with an increase in the quantity of an illumination light to be projected, a damage of the sample is larger. With a reduction in the quantity of the same, a damage is smaller. If a damage of the sample is large, not only reproducibility will be reduced when the sample is observed again and measured but also a quality of the sample as a product will be reduced. If the sample is a living being such as a microorganism, the living being may die.

SUMMARY OF THE INVENTION

It is an object of the present invention to provide a microscope capable of reducing damage such as deformation, discoloration or the like given to a sample.

In accordance with a first aspect of the invention, a microscope is disclosed, which comprises: a light source; an illumination optical system for irradiating a sample with an illumination light emitted from the light source; a stage for placing the sample; an image-forming optical system for collecting an observed light exiting from the sample; a detector for detecting the observed light passing through the image-forming optical system; a processing unit for processing a signal from the detector; a display for displaying an image of the sample based on a video signal from the processing unit; and an illuminance reducing unit for reducing illuminance of the illumination light on the sample to be lower than a specified value enough for observation by the display.

With this microscope, by operating the illuminance reducing unit at a specified timing according to conditions including a movement of the stage or the like, it is possible to prevent inconveniences such as damage given to the sample by an excessive quantity of illumination light made incident on the same.

In accordance with a second aspect of the invention, a microscope is disclosed, which comprises: a light source; an illumination optical system for irradiating a sample with an illumination light emitted from the light source; a stage for placing the sample; a stage driving system for driving the stage; an image-forming optical system for collecting an observed light exiting from the sample; a detector for detecting the observed light passing through the image-forming optical system; a processing unit for processing a signal from the detector; and a monitor for displaying an image of the sample based on a video signal from the processing unit. The microscope further comprises illuminance reducing means for reducing illuminance of the illumination light on the sample, and is characterized in that assuming that a time width where illuminance is at a level enough for displaying an image of the sample is $T_F$, and a time width where illuminance is lower than the level for displaying an image of the sample is $T_N$, and a value $\alpha$ is as follows:

$$\alpha = T_F/(T_F + T_N) \tag{1}$$

the value $\alpha$ is changed by the illuminance reducing means according to a velocity of the stage, and the monitor (or display) displays a still picture of the sample for a period of $T_N$, the still picture being one before the time width $T_N$.

In this case, the illuminance reducing means can set the value $\alpha$ to 0 while the stage is stopped, and to 1 while the stage is on the move.

With the foregoing constitution, since the irradiation quantity of illumination light in the same sample face is reduced, damage given to the sample is reduced. Next, an operation of the microscope of the invention will be described in detail. Generally, a sample placed on the stage of the microscope such as an industrial microscope is a static object. In other words, the sample unless a microorganism or the like never moves around itself.

Thus, while the stage where the sample has been placed is stopped, no change occurs in an image of the sample displayed on the monitor. Even while the stage is not completely stopped, if a velocity of a movement thereof is relatively low, a latest still picture may be displayed on the monitor while updating the same. In this way, a state is realized, which is nearly the same as that of displaying a motion picture (live image) of the sample in real time.

For example, consideration is given to a case where while the stage is in a stopped state, in other words while a stage velocity is 0, a monitor screen is frozen (fixed) without displaying the motion picture of the sample on the monitor, and the still picture of the sample is displayed. In this case, the stage is stopped and, at the instant of the stoppage thereof or after the passage of specified time, illuminance of an illumination light reaching the sample is reduced. As a result, damage given to the sample can be prevented.

On the monitor (or display), an image immediately before reduction of the illuminance is displayed as a still picture. In other words, the monitor screen is made frozen. Thus, no inconveniences occur for observation or measuring.

On the other hand, if the movement of the stage is started again, the illuminance of the illumination light reaching the sample is immediately restored to a normal value, and a motion picture of the sample is displayed on the monitor.

Here, the stopped state of the stage means that no displacement occurs in the stage not only in directions (X, and Y directions) orthogonal to an optical axis but also in a direction of the optical axis (Z direction). Thus, since the stage is not in a stopped state in a step of searching a desired position on the sample (moving step in X and Y directions) or in a step of adjusting a focus position (moving step in Z direction), the motion picture is displayed on the monitor. After the above operations are finished, then the stage is placed in a stopped state for the first time, and the still picture is displayed on the monitor.

Displacement of the stage can be easily detected by using a displacement gauge such as an encoder, an interferometer or the like. Also, in the case of using an electric stage, stage displacement can be detected based on existence of an operation of a stage driving motor.

Furthermore, reduction of the illuminance of the illumination light reaching the sample can be achieved by reducing an output of the light source or stopping the same. This can also be achieved by using a shutter to cut off the illumination light. Other than these, the illumination light may be cut off by using polarization to rotate a polarizing plate or a wavelength plate, alternatively by electrically modulating a liquid crystal wavelength plate.

Thus, with the present invention, according to a stage velocity v, the illuminance of the illumination light reaching the sample is adjusted, in other words, the value $\alpha$ in the expression (1) is changed.

In accordance with a third aspect of the invention, a microscope is disclosed, which comprises: a light source; an illumination optical system for irradiating a sample with an illumination light emitted from the light source; a stage for placing the sample; a stage driving system for driving the stage; an image-forming optical system for collecting an observed light exiting from the sample; a detector for detecting the observed light passing through the image-forming optical system; a processing unit for processing a signal from the detector; and a monitor for displaying an image of the sample based on a video signal from the processing unit. The microscope further comprises: illuminance reducing means for reducing illuminance of the illumination light on the sample; and a switch for performing switching between a continuous mode and an intermittent mode, the continuous mode being for displaying a video signal as a motion picture on the monitor, the video signal being one when illuminance is at a level enough for displaying an image of the sample, and the intermittent mode for a video signal as a still picture on the monitor while updating the same by using the illuminance reducing means to intermittently reduce illuminance, the video signal being one immediately before illuminance is set lower than the level enough for displaying an image of the sample.

In this case, the microscope further comprises displacement detecting means for detecting the displacement of the sample, and it is preferred that when the sample is displaced, the continuous mode should be set irrespective of a position of the switch.

With the foregoing constitution, damage given to the sample can be reduced by reducing an irradiation quantity of illumination light for a sample face. Next, an operation of the microscope of the invention will be described in detail. Generally, in any field, such as an industrial field, a biological field or otherwise, with the microscope, since observation accuracy must be maintained for image observation, illuminance should not be reduced unnecessarily. As described above, however, an observer may need to observe an image of the sample placed in a near static state for a long time.

Thus, if the observer determines no necessity of continuous illumination or image capturing (continuous mode), by using the switch to make switching to the intermittent mode for intermittently performing illumination and image capturing, an irradiation quantity to the sample is reduced and, accordingly, damage given to the sample can be prevented. Subsequently, when an image is changed every moment, for example the sample is moved or, a focus is changed, the intermittent mode may be changed to the continuous mode by switching the switch. In this case, since cancellation of the intermittent mode depends on determination by the observer, priority is placed on relative sample damage reduction.

On the other hand, for placing priority on relative sample observation, detection may be performed for sample displacement, and the intermittent mode may be forcibly canceled when sample displacement is detected.

In accordance with a fourth aspect of the invention, a microscope is disclosed, which comprises: a light source; an illumination optical system for irradiating a sample with an illumination light from the light source; a stage for placing the sample; an image-forming optical system for collecting an observed light exiting from the sample; a detector for detecting the observed light passing through the image-forming optical system; a processing unit for processing a signal from the detector; and a monitor for displaying an image of the sample based on a video signal from the processing unit. The microscope is characterized in that a change amount of a video signal entered into the processing unit is detected, illuminance of the illumination light on the sample is reduced to a level for detecting the change amount of the video signal when the change amount of the video signal is smaller than a predetermined value, the video signal immediately before reduction of the illuminance is sent as a still picture to the monitor, the illuminance is set to the level enough for displaying an image of the sample when the change amount of the video signal is equal to the predetermined value or larger, and the video signal at this time is sent as a motion picture to the monitor.

With the foregoing constitution, an irradiation quantity of illumination light for the sample is reduced, and damage given to the sample can be reduced. Next, an operation of the microscope of the invention will be described in detail. In the microscope, illuminance should not be reduced unnecessarily for performing image observation. But an observer may need to watch an image of the sample placed in a near static state for a long time.

Thus, at the instant of this state or after the passage of predetermined time, by dimming the illumination light, damage given to the sample can be prevented. In this case, on the monitor, an image immediately before dimming is displayed in a frozen (fixed) manner. Accordingly, since no change occurs in the image, any inconveniences can be prevented for observation. Also, since the illuminance is reduced, damage given to the sample can be prevented.

Then, if a change occurs in the image, a screen on the monitor is immediately returned to a motion picture (live image).

In this case, for detecting changes in the image, image capturing is constantly executed. In other words, usually, image capturing and corresponding displaying on the monitor are both executed. During dimming, image capturing is executed, but no corresponding displaying is executed on the monitor. Then, determination is always performed as to existence of a change in the image by image capturing. If no image changes are determined, then image capturing in a dimmed state is continued. If an image change is determined, a motion picture is displayed on the monitor.

Thus, if there are no substantial changes in the image on the monitor, illumination of the sample is dimmed. If the image is changed every moment, for example during searching of a desired position on the sample, during adjusting of a focus position, while a living being as a sample is alive and moving or the like, a motion picture is always displayed on the monitor. Conversely, if the sample becomes static, for example when position adjusting, focus adjusting or the like is finished, the process changes to a dimmed state.

In this case, a unit constitution for detecting image changes should preferably include a memory for storing image data of a plurality of frames, and an electric processing system for comparing images with each other based on information thereof and determining a change.

In accordance with a fifth aspect of the invention, a microscope is disclosed, which comprises: a light source; an illumination optical system for irradiating a sample with an illumination light emitted from the light source; a stage for placing the sample; an image-forming optical system for collecting an observed light exiting from the sample; a detector for detecting the observed light passing through the image-forming optical system; a processing unit for processing a signal from the detector; and a monitor for displaying an image of the sample based on a video signal from the processing unit. The microscope further comprises: illuminance reducing means for reducing illuminance of the illumination light on the sample; and control means for detecting a change amount of the video signal entered into the processing unit and controlling the illuminance reducing means and the processing unit according to the change amount.

With the foregoing constitution, by reducing an irradiation quantity of illumination light to the sample face, damage given to the sample can be reduced. Next, an operation of the microscope of the invention will be described in detail. In the microscope, illuminance should not be reduced unnecessarily for performing image observation. But an observer may need to watch an image of the sample placed in a near static state for a long time. In such a case, substantially no changes occur in an image on the monitor.

Thus, at the instant of the above state or after the passage of predetermined time, by reducing illuminance of the illumination light, damage given to the sample can be prevented. At this time, on the monitor, an image immediately before the illuminance is reduced is displayed in a frozen (fixed) manner. In this way, since no changes occur in the image, any inconveniences can be prevented for the observer. Also, since the illuminance is reduced, damage given to the sample can be reduced.

Then, if any changes occur in the image, a screen on the monitor is immediately returned to a motion picture (live image).

In this case, for detecting an image change, short-time image capturing is performed at every constant interval of time even while the image is frozen. Then, determination is made as to a change in the image around this time interval. If no image changes are determined, then only intermittent image capturing is continued. If an image change is determined, then only continuous image capturing is carried out to return to the motion picture.

Thus, if there are no substantial changes in the image on the monitor, since the sample is illuminated intermittently, an irradiation quantity of illumination light is reduced. If the image is changed every moment, for example during searching of a desired position on the sample, during adjusting of a focus position, or while a living being as a sample or the like is alive and moving, the motion picture is always displayed on the monitor. Conversely, if the sample becomes static, for example when position adjusting or focus adjusting is finished, the process proceeds to an intermittent image capturing state.

A unit constitution for detecting image changes should preferably include, for example a memory for storing image data of a plurality of screens, and an electric processing system for comparing images with each other based on information thereof and determining a change.

DETAILED DESCRIPTION OF THE PREFERRED EMBODIMENTS (First Embodiment)

Figure 1:
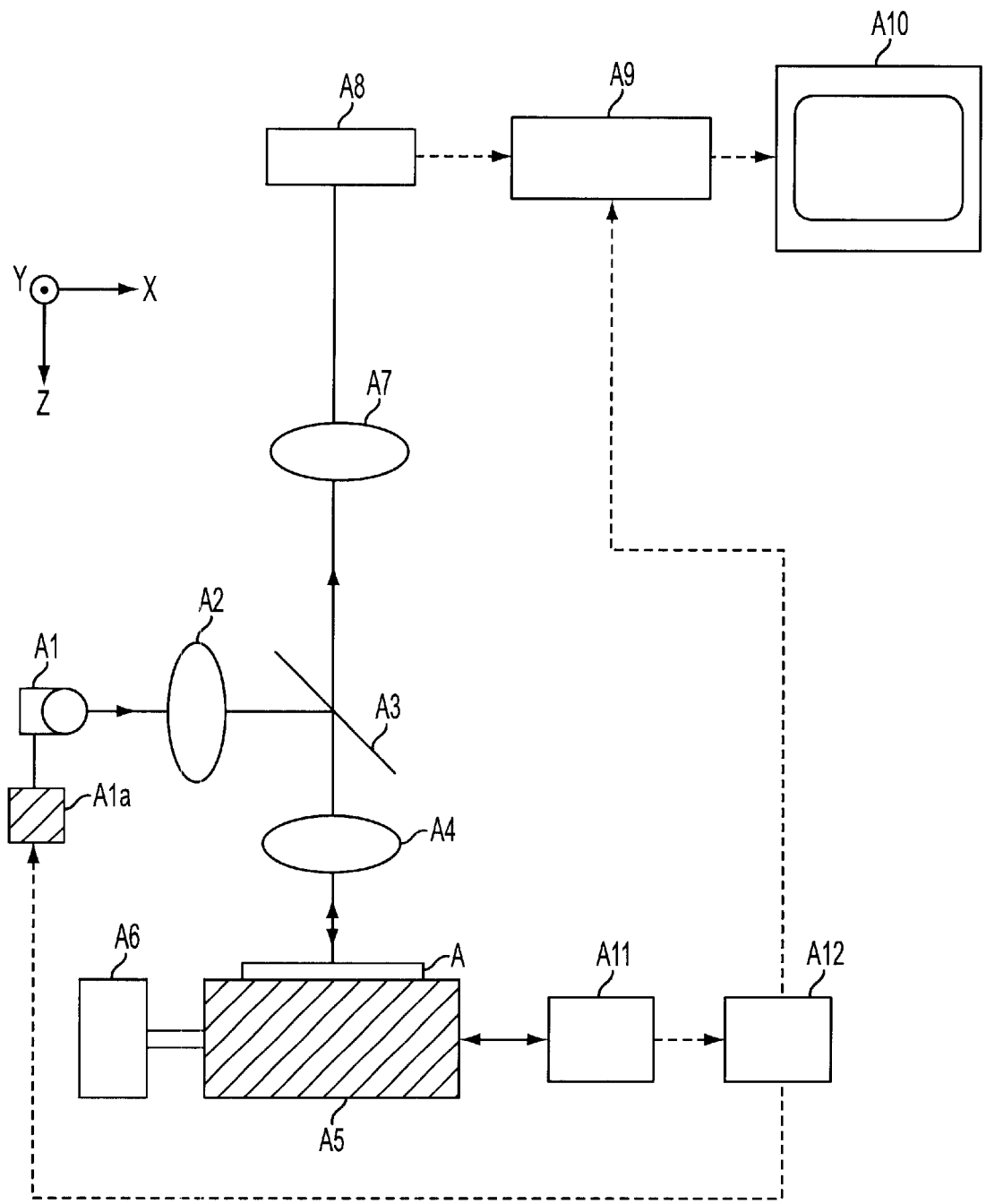
FIG. 1 is a schematic view showing a microscope of a first embodiment of the present invention.

FIG. 1 shows a microscope according to a first embodiment of the present invention. An illumination light emitted from a light source A1 is transmitted through an illuminating lens A2, and made incident on a half mirror A3. Here, an output of the light source A1 is controlled by a light source control unit A1a. A part of the illumination light made incident on the half mirror A3, which has been reflected by the same, is transmitted through an objective lens A4 to illuminate a sample A placed on a stage A5. In this case, the stage A5 can be moved in X, Y and Z directions by a stage driving system A6.

An observed light reflected on the sample A is transmitted through the objective lens A4, and made incident on the half mirror A3. After having passed through the half mirror A3, the observed light is transmitted through an image-forming lens A7 to form an image on an image sensor A8. An output signal from the image sensor A8 is converted into a video signal by a video signal processing circuit A9, and then transferred to a monitor A10. Thus, an image of the sample A is displayed on the monitor A10.

A position of the stage A5 is detected by a displacement sensor A11. An output signal from the displacement sensor A11 is transferred to a control circuit A12. The control circuit A12 calculates a velocity of the stage A5 based on the output signal from the displacement sensor A11. In other words, a movement or a stoppage of the stage A5 is identified. Specifically, a movement of the stage A5 is identified if there is fluctuation in an output value. If there is no fluctuation in the output value, a stoppage of the stage A5 is identified. Then, if no fluctuation occurs in the output signal from the displacement sensor A11 continuously for a predetermined period of time, i.e., if a stoppage of the stage is determined, an output of the light source A1 is stopped (switched OFF). At the same time, the video signal processing circuit A9 interrupts capturing of the image of the sample A, and an image immediately before the output of the light source is switched OFF is displayed as a still picture on the monitor A10. Any one of timings can be set for capturing the image of the sample A to be displayed on the monitor A10, as long as it is after the stage A5 is stopped and before the output of the light source A1 is stopped.

Then, if fluctuation occurs again in the output signal from the displacement sensor A11, in other words, if another movement of the stage A5 is determined, the control circuit A12 immediately switches ON the output of the light source A1. At the same time, the video signal processing circuit A9 starts capturing of the image of the sample A. Thus, a motion picture of the sample A is displayed again on the monitor A10.

In the first embodiment, illuminance reaching the sample A is reduced by switching ON/OFF the output of the light source A1. Instead of switching ON/OFF, the output of the light source A1 may be reduced. In this case, illuminance may be reduced to, for example 10% or lower. Also, a shutter may be inserted in an optical path of an illumination light from the light source A1 to the stage A5 and, by opening/closing this shutter, the illumination light may be cut off/released. In this case, the shutter must be capable of reducing illuminance to a certain extent even if it cannot completely cut off the illumination light. For example, the shutter may be one, which can reduce illuminance of an illumination light to 10% or lower.

As can be understood from the foregoing, according to the first embodiment, damage given to the sample A can be effectively reduced by preventing the sample A from being irradiated with an unnecessary illumination light.

Next, description will be made specifically of a case of observing a photoresist as the sample A used for semiconductor manufacturing by using the microscope constructed in the foregoing manner.

Figure 2:
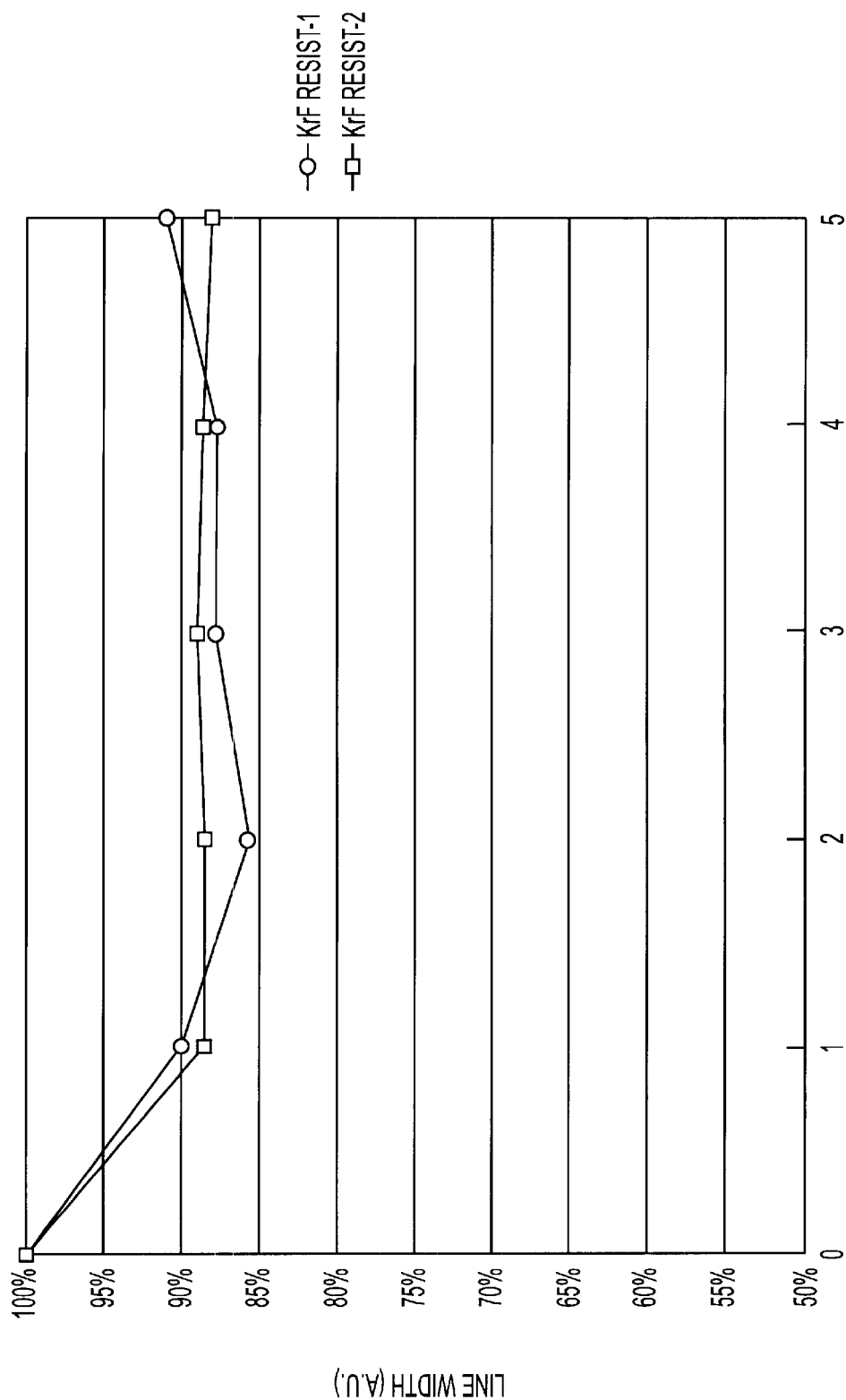
FIG. 2 is a graph showing a relationship between irradiation time of an illumination light and a change in a line width.

FIG. 2 is a graph showing a relationship between irradiation time of an illumination light and a change in a line width. An axis of abscissas indicates continuous irradiation time of an illumination light, while an axis of ordinates indicates a reduction ratio in a line width of a resist pattern. Regarding resists, by using two kinds of resists for KrF excimer laser exposure, a line and space pattern was formed. A wavelength of a KrF excimer laser was 228 nm, and a wavelength of an illumination light for observation by the microscope was 266 nm, which was not much different from that of the former. As can be understood from the graph, as the sample A which is a photoresist is continuously irradiated with an illumination light to observe a resist pattern, considerable damage is given to the resist. Specifically, line width of the line and space pattern is reduced with observing time by the illumination light, and a line width reduction of 10% can be recognized for observation of 1 minute. For inspecting a product during semiconductor manufacturing, such a reduction rate cannot be permitted.

In the embodiment, for observing the resist pattern, irradiation with an illumination light is continued until a stoppage of movement of the stage A5 is detected. If a stoppage of movement of the stage A5 is detected, the video signal processing circuit A9 is immediately operated to capture a still picture of the sample A, and then the light source control unit A1a is operated to interrupt the irradiation of the sample A with the illumination light. In this case, a time from the stoppage detection of the stage A5 to the irradiation interruption of the sample A is set within, for example several seconds. Accordingly, the time of continuously making the illumination light incident on the resist pattern can be easily prevented from exceeding several seconds, and damage (reduction in the line width) can be effectively prevented from being given to the sample A.

The foregoing description was for the case of observing the resist pattern. But cases other than that of using the resist pattern as a target are possible. For example, in the case of observing a microorganism or the like as the sample A, as in the case of the above, a state of the living being as a target for observation can be observed without damaging the same.

In the first embodiment, the output of the light source A1 is switched ON/OFF based on the output of the displacement sensor A11. This means that adjustment is performed for a time width $T_F$ where illuminance is enough for displaying the image of the sample A on the monitor A10, and a time width $T_N$ where illuminance is less than the level enough for displaying the same on the monitor A10 according to the movement of the stage A5. In other words, the following is changed between moving time of the stage A5 and unmoving time thereof.

$$\alpha = T_F/(T_F + T_N) \qquad (1)$$

Specifically, the output of the light source A1 is kept in an OFF state in order to set a value $\alpha$ to 0 while the stage A5 is stopped. The output of the light source A1 is kept in an ON state in order to set a value $\alpha$ to 1 while the stage A5 is on the move.

A method of changing the value $\alpha$ should not be limited to that of the first embodiment. But an optional method can be employed according to a condition for use or the like. Each of FIGS. 3A to 3D shows a specific example of a method of changing the value $\alpha$.

In each of FIGS. 3A to 3D, an axis of abscissas indicates a velocity v of the stage A5, and an axis of ordinates indicates a value $\alpha$. Herein, a stage velocity v is obtained by composition of respective velocities $v_x$, $v_y$ and $v_z$ of x, y and z directions as shown in the following expression.

$$V = \sqrt{V_x^2 + V_y^2 + V_z^2}$$

Figure 3A:
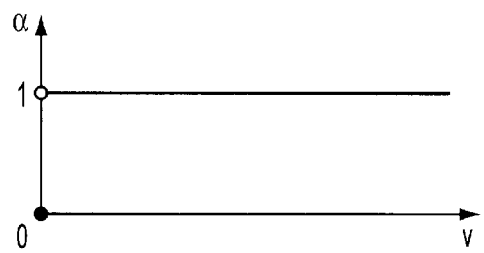
FIG. 3 is a graph showing a relationship between a stage velocity v and an α value.

FIG. 3A corresponds to the operation example described above with reference to the first embodiment, specifically showing a case of performing control so as to set a value $\alpha$ to 0 when a stage velocity v is 0. In other words, a time width $T_F$ is set to 0, the time width $T_F$ having illuminance enough for displaying the image of the sample A when the stage A5 is stopped. A time width $T_N$ is set to 0, the time width $T_n$, having illuminance less than the level enough for displaying the image of the sample A when the stage A5 is moved even slightly. Either one of the modes may be employed: one mode for reducing illuminance immediately when the stage A5 is stopped; the other mode for gradually reducing illuminance.

Figure 3B:
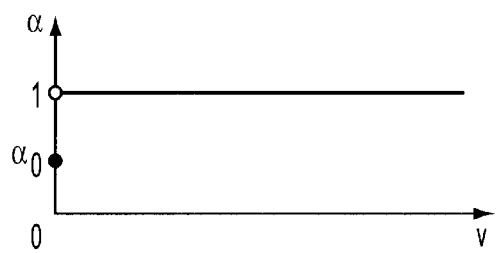

FIG. 3B shows a case of performing control so as to set a value $\alpha$ ($\alpha_0$) to $0 < \alpha_0 < 1$ when a stage velocity is 0. In other words, when the stage A5 is stopped, a ratio of the time width $T_F$ and the time width $T_N$ is constant: the former having illuminance enough for displaying the image of the sample A, and the latter having illuminance less than the level enough for displaying the same. When the stage A5 is moved even slightly, the time width $T_N$ is 0, the time width $T_N$ having illuminance less than the level enough for displaying the image of the sample A. A mode to be employed is one for updating a still picture by increasing illuminance at every constant interval of time when the stage A5 is stopped.

Figure 3C:
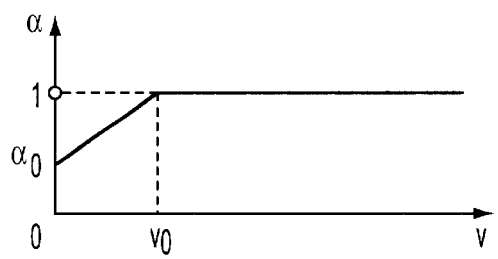

FIG. 3C shows a case of performing control so as to change a value α in proportion while a stage velocity v reaches a specified velocity $v_0$ from 0. In other words, when a velocity of the stage is $v_0$ or lower, a ratio of the time width $T_F$ having a sufficient illuminance and the time width $T_N$ having illuminance less than the sufficient level fluctuates according to the velocity thereof. A mode to be employed is, as described above, one for displaying an updated still picture on the monitor A10 while the stage A5 is moved at a low velocity. In this mode, as the stage velocity v is reduced, an updating interval of the still picture is longer.

Figure 3D:
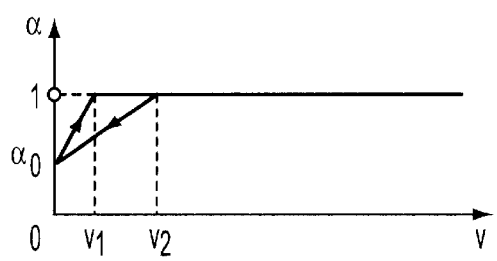

Unlike the case shown in FIG. 3C, FIG. 3D shows a case of performing control so as to set a gradient of a value α when the velocity of the stage A5 is reduced different from that when the stage A5 is accelerated. In other words, a stage velocity $v_1$ during acceleration when the time width $T_N$ having illuminance less than the enough level is 0, is set lower than a stage velocity $v_2$ during reduction, when the time width $T_N$ is 0.

(Second Embodiment)

Figure 4:
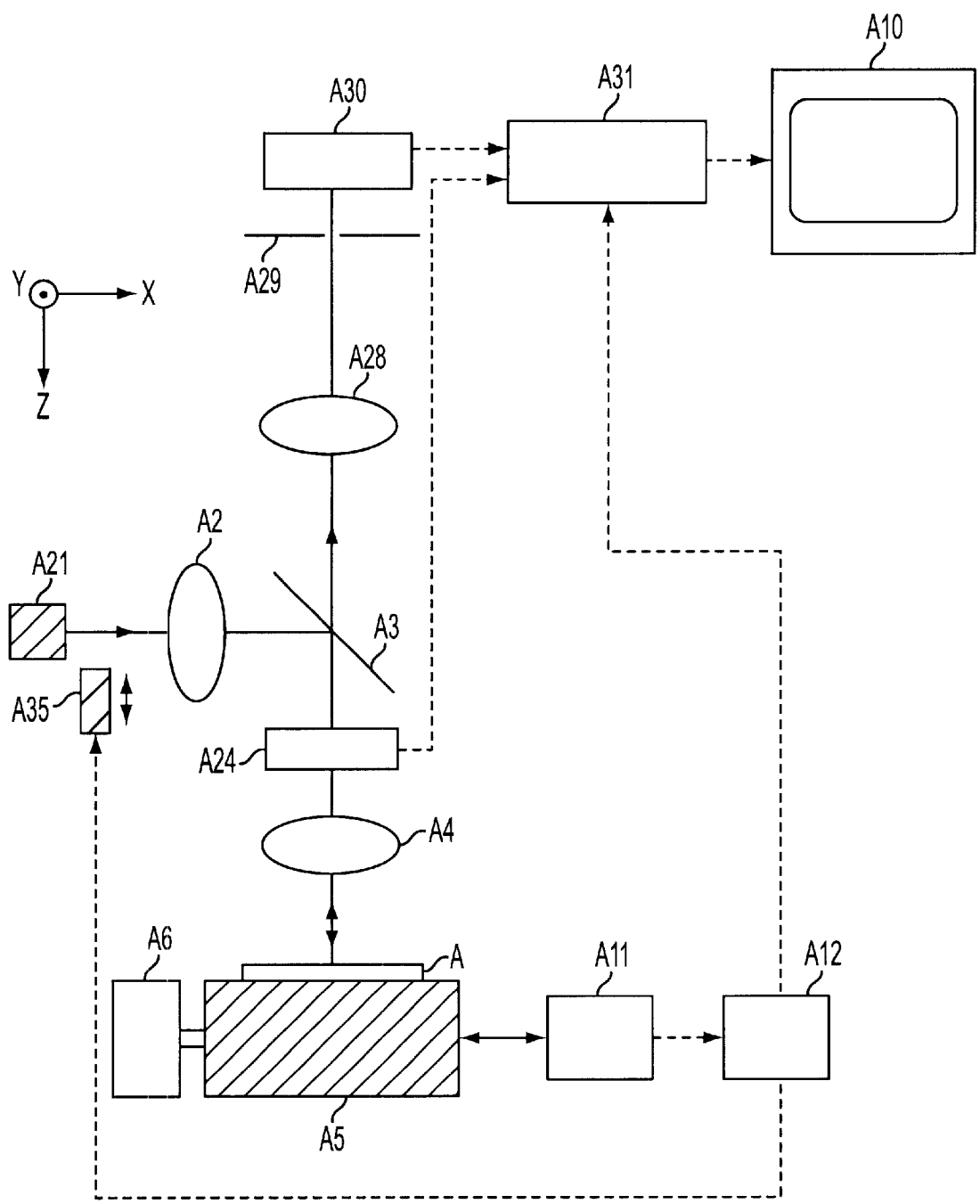
FIG. 4 is a schematic view showing a microscope of a second embodiment.

FIG. 4 shows a confocal laser-scanning microscope of a second embodiment. An illumination light emitted from a laser light source A21 is transmitted through an illuminating lens A2, and made incident on a half mirror A3. The illumination light reflected by the half mirror A3 is transmitted through a two-dimensional light beam scanner A24 and an objective lens A4 to form a very small laser spot in the surface of a sample A placed on a stage A5.

An observed light reflected on the sample A is transmitted through the objective lens A4 and the two-dimensional light beam scanner A24, and then made incident on the half mirror A3. After having passed through the half mirror A3, the observed light is transmitted through a collective lens A28 to form a spot again on a pinhole A29. The observed light transmitted through the pinhole A29 is made incident on a detector A30. After having been made incident on the detector A30, the observed light is subjected to photoelectric conversion. The converted signal is then input together with a control signal from the two-dimensional light beam scanner A24 to a signal processing circuit A31, and transferred to a monitor A10. Accordingly, an enlarged image of the sample A is displayed on the monitor A10.

As in the case of the first embodiment, in the second embodiment, a control circuit A12 performs identification as to a movement/stoppage of the stage A5 based on an output signal from a displacement sensor A11. When the stage A5 is stopped for predetermined time, a shutter A35 moves into an optical path of an illumination light. At the same time, capturing of an image of the sample A performed by the signal processing circuit A31 is interrupted, and then a still picture immediately before the illumination light is cut off is displayed on the monitor A10. On the other hand, when a movement of the stage A5 is started again, the shutter A35 immediately moves out of the optical path. Simultaneously, the signal processing circuit A31 starts capturing the image of the sample A, and a motion picture is displayed again on the monitor A10.

Thus, in the second embodiment, as in the case of the first embodiment, damage given to the sample A can be effectively reduced by preventing unnecessary irradiation of the sample A with an illumination light. Also, in the second embodiment, with the use of the laser light source A21, a wavelength area thereof is short. If the wavelength is shorter than a visible area, for example if the area has a short wavelength of an ultraviolet ray area to a soft X ray area, then it is especially important to reduce damage given to the sample by preventing unnecessary irradiation of the sample with an illumination light.

In the second embodiment, a relationship between the velocity of the stage A5 and the value a in the expression (1) is like that shown in FIG. 3A. Instead, a relationship can be like that shown in each of FIGS. 3B to 3D.

The second embodiment has been described with particular reference to the microscope of a reflected illumination type. But the present invention can be applied to a microscope of a transmission illumination type.

Furthermore, the microscope of the embodiment can be used as a measuring device for measuring the sample A on the monitor A10.

(Third Embodiment)

Figure 5:
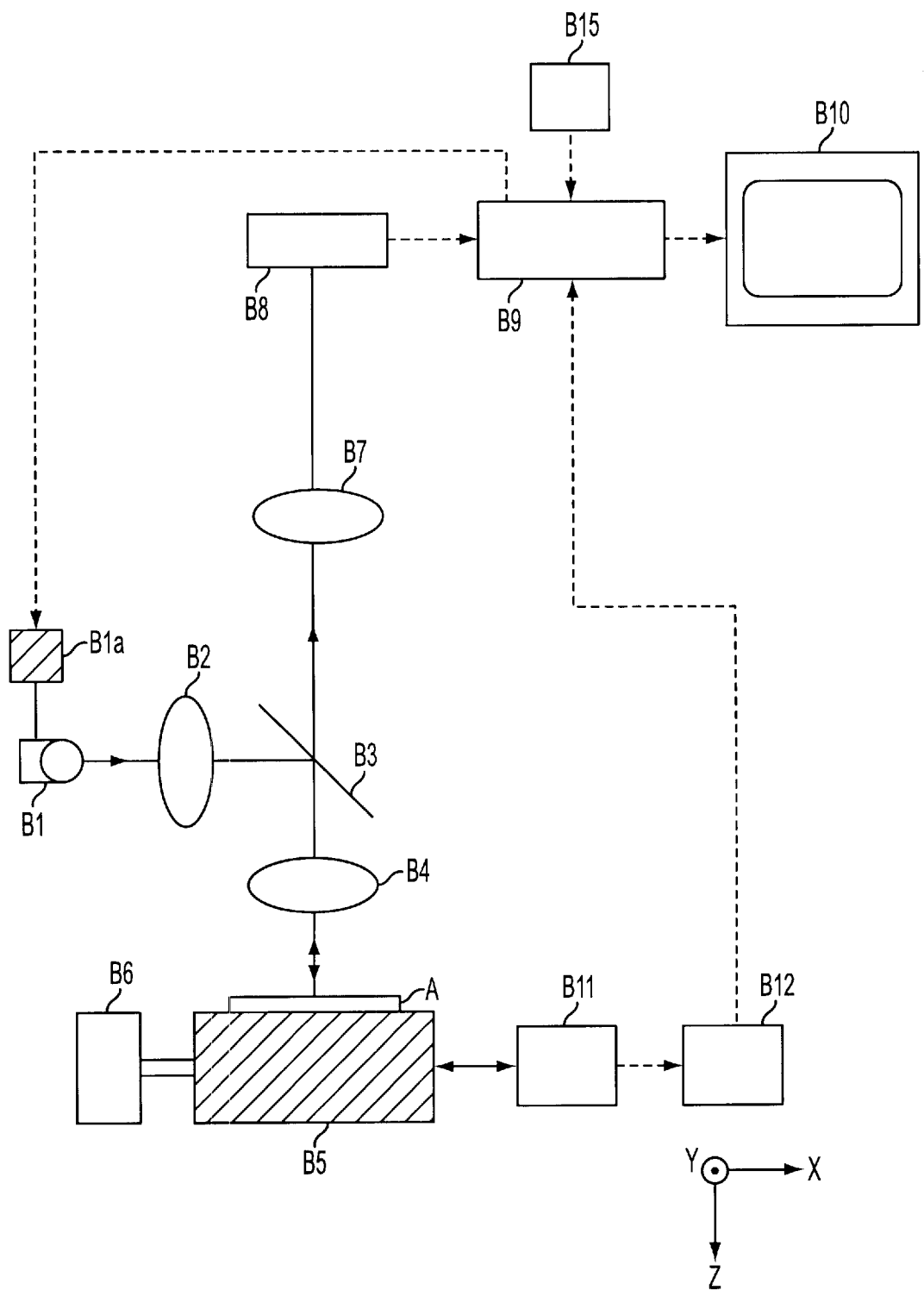
FIG. 5 is a schematic view showing a microscope of a third embodiment.

FIG. 5 shows a microscope according to a third embodiment of the present invention.

An illumination light emitted from a light source B1 is transmitted through an illuminating lens B2, and made incident on a half mirror B3. Here, an output of the light source B1 is controlled by a light source control unit B1a. A part of the illumination light made incident on the half mirror B3, which has been reflected by the same, is transmitted through an objective lens B4 to illuminate a sample A placed on a stage B5. In this case, the stage B5 can be moved in X, Y and Z directions by a stage driving system B6.

An observed light reflected on the sample A is transmitted through the objective lens B4, and then made incident on the half mirror B3. After having passed through the half mirror B3, the observed light is transmitted through an imageforming lens B7 to form an image on an image sensor B8. Then, at the time of usual sample observation (continuous mode), an output signal from the image sensor B8 is converted into a video signal by a video signal processing system B9, and then transferred to a monitor B10. Accordingly, in the continuous mode, continuous irradiation is performed for the sample A, and a motion picture of the sample A is displayed on the monitor B10.

In the microscope of the third embodiment, a switch B15 is installed. By switching the switch B15, an observer can perform switching between the continuous mode and an intermittent mode. In the intermittent mode, a signal is sent from the video signal processing circuit B9 so as to repeat intermittent switching ON/OFF of a power source for the light source B1. In accordance with this operation, image capturing carried out by the signal processing circuit B9 is also intermittent.

In other words, in the intermittent mode, while the power source for the light source B1 is switched OFF, an image of the sample A immediately before the power source is switched OFF is displayed as a still picture on the monitor B10. For each repetition of switching ON/OFF of the power source, the still picture on the monitor B10 is updated.

On the other hand, a position of the stage B5 is detected by a displacement sensor B11, and an output signal therefrom is transferred to a control circuit B12. The control circuit B12 performs identification as to a movement/stoppage of the stage B5 based on the output signal from the displacement sensor B11. In other words, a movement of the stage B5 is recognized when there is fluctuation in an output value. When there is no fluctuation in an output value, a stoppage of the stage B5 is recognized.

If fluctuation occurs in the output signal from the displacement sensor B11, in other words if a movement of the stage B5 is determined, then the intermittent mode is forcibly canceled to change to the continues mode. Then, the output of the light source B1 is immediately switched ON. At the same time, the video signal processing circuit B9 starts continuous capturing of the image of the sample A. Accordingly, the motion picture is displayed again on the monitor B10.

Thus, in the third embodiment, depending on determination made by an observer, damage given to the sample A can be effectively reduced by preventing unnecessary irradiation of the sample A with an illumination light.

In the third embodiment, the intermittent mode is forcibly canceled by detecting the movement of the stage B5. But without detecting the movement of the stage B5, cancellation of the intermittent mode may be performed only by the operation of the switch B15 carried out by the observer. This case is effective when priority is placed on sample damage prevention, because intermittent illumination and image capturing are continued until the continuous mode is restored.

In the third embodiment, displacement of the stage B5 is detected by using the displacement sensor B11, e.g., an encoder, an interferometer or the like. But if an electric stage is used as a stage, stage displacement can be detected based on existence of an operation of a stage driving motor.

Furthermore, in the third embodiment, illuminance reaching the sample A is reduced by switching ON/OFF the output of the light source B1. Instead, the output of the light source B1 is reduced, for example to 10% or lower. Also, a shutter may be inserted in an optical path of an illumination light from the light source B1 to the stage B5 and, by opening/released this shutter, an illumination light may be cut off/canceled. In this case, even if the illumination light cannot be completely cut off, illuminance must be reduced to a certain extent. For example, the shutter may be one, which is capable of reducing illuminance of the illumination light to 10% or lower.

(Fourth Embodiment)

Figure 6:
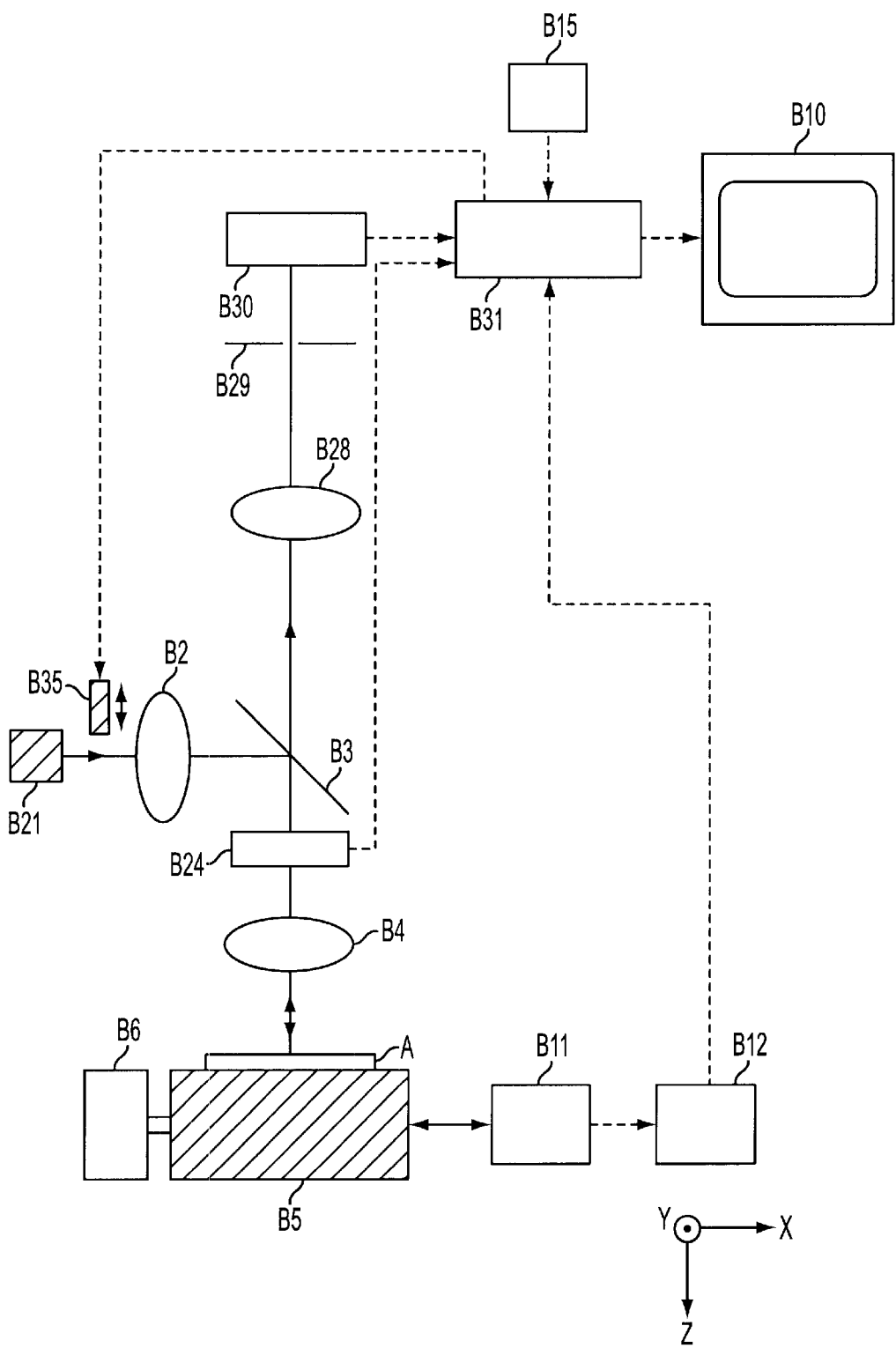
FIG. 6 is a schematic view showing a microscope of a fourth embodiment.

FIG. 6 shows a confocal laser-scanning microscope of a fourth embodiment.

An illumination light emitted from a laser light source B21 is transmitted through an illuminating lens B2, and made incident on a half mirror B3. Then, the illumination light reflected by the half mirror B3 is transmitted through a two-dimensional light beam scanner B24 and an objective lens B4 to form a very small laser spot in the surface of a sample A placed on a stage B5.

An observed light reflected on the sample A is transmitted through the objective lens B4 and the two-dimensional light beam scanner B24, and made incident on the half mirror B3. After having passed through the half mirror B3, the observed light is transmitted through a collective lens B28 to form a spot again on a pinhole B29. After having passed through the pinhole B29, the observed light is made incident on a detector B30. The observed light made incident on the detector B30 is subjected to a photoelectric conversion. Then, the converted signal is passed together with a control signal from the two-dimensional light beam scanner B24 to a signal processing system B31, and transferred to a monitor B10. Accordingly, an enlarged image of the sample A is displayed on the monitor B10.

As in the third embodiment, in the fourth embodiment, a switch B15 is installed. An observer can switch between a continuous mode and an intermittent mode by switching the switch B15. In the intermittent mode, a signal is sent from the signal processing system B31 to a shutter B35. The shutter B35 is moved to repeat intermittent cutting-off/ releasing of an illumination optical path. In accordance with this operation, image capturing carried out by the signal processing system B31 is also intermittent.

In other words, in the intermittent mode, while the illumination optical path is cut off by the shutter B35, an image of the sample A immediately before cutting-off is displayed as a still picture on the monitor B10. For each repetition of the cutting-off/release of the illumination optical path, the still picture on the monitor B10 is updated.

If fluctuation occurs in an output signal from a displacement sensor B11, in other words if a movement of the stage B5 is determined, the intermittent mode is forcibly canceled to change to the continuous mode, and the shutter B35 immediately moves out of the optical path. At the same time, the signal processing system B31 starts continuous capturing of the image of the sample A, and the motion picture is displayed again on the monitor B10.

Thus, in the fourth embodiment, as in the case of the third embodiment, depending on determination made by the observer, damage given to the sample A can be effectively reduced by preventing unnecessary irradiation of the sample A with an illumination light. Also, in the fourth embodiment, with the use of the laser light source B21, a wavelength area thereof is short. If the wavelength area is shorter than a visible area, for example if the area has a short wavelength of an ultraviolet ray area to a soft X ray area, then it is especially important to reduce damage given to the sample by preventing unnecessary irradiation of the same with an illumination light.

In the embodiment, the signal processing system such as the video signal processing system B9, the signal processing system B31 or the like performs control for illumination based on a signal externally provided by the switch B15 or the like. But such determination and command systems may be set independent of each other.

The embodiment has been described with particular reference to the microscope of a reflected illumination type. But the present invention can be applied to a microscope of a transmission illumination type.

Furthermore, the microscope of the embodiment can be used as a measuring device for measuring the sample on the monitor B10.

(Fifth Embodiment)

Figure 7:
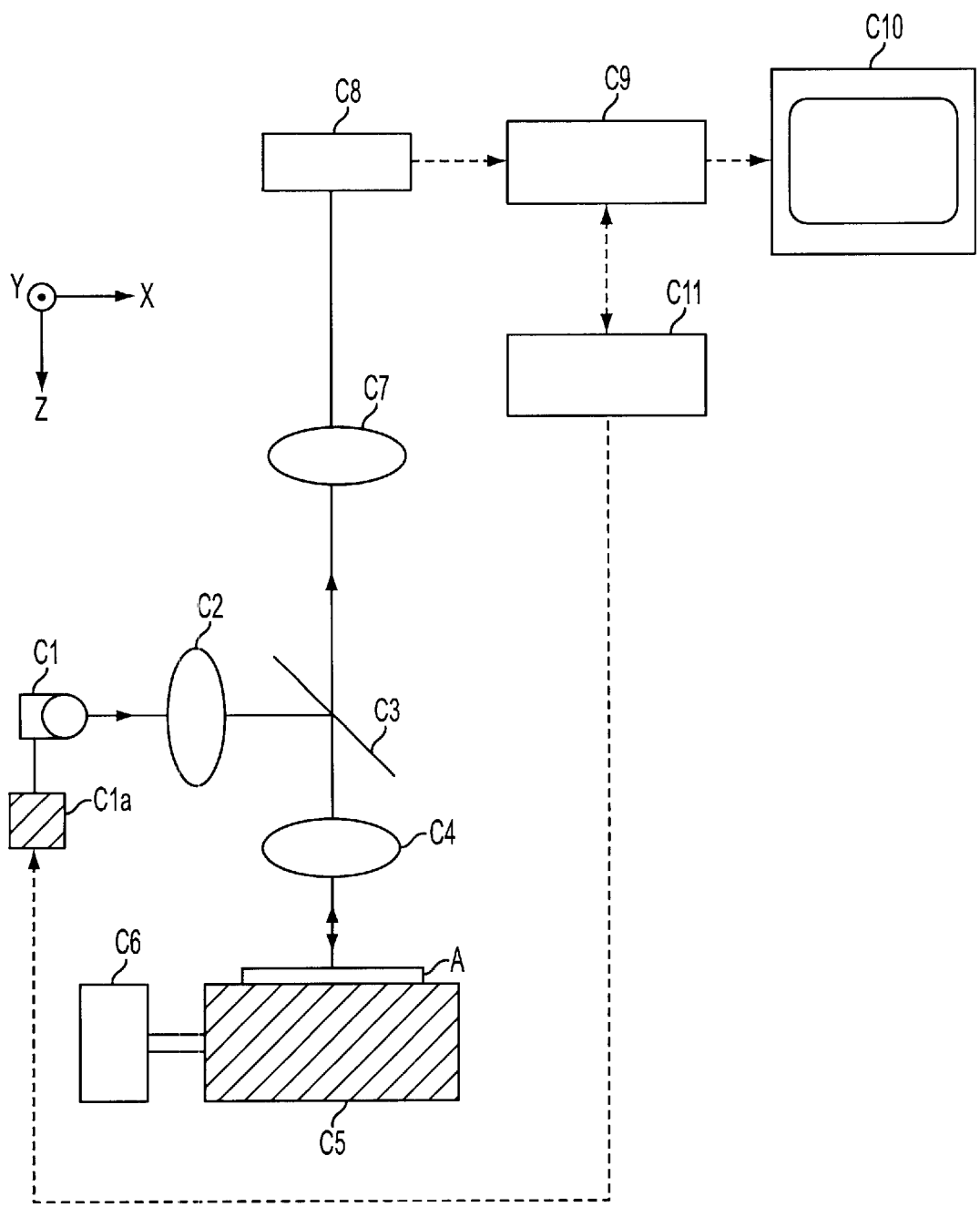
FIG. 7 is a schematic view showing a microscope of a fifth or seventh embodiment.

FIG. 7 shows a microscope according to a fifth embodiment of the present invention.

An illumination light emitted from a light source C1 is transmitted through an illuminating lens C2, and made incident on a half mirror C3. Here, an output of the light source C1 is controlled by a light source control unit C1a. A part of the illumination light made incident on the half mirror C3, which has been reflected by the same, is transmitted through an objective lens C4 to illuminate a sample A placed on a stage C5. In this case, the stage C5 can be moved in X, Y and Z directions by a stage driving system C6.

An observed light reflected on the sample A is transmitted through the objective lens C4, and made incident on the half mirror C3. After having passed through the half mirror C3, the observed light is transmitted through an image-forming lens C7 to form an image on an image sensor C8. Then, an output signal from the image sensor C8 is converted into a video signal by a video signal processing system C9.

The video signal obtained by the conversion of the output signal performed in the video signal processing system C9 is transferred to an image determination circuit C11. The image determination circuit C11 performs determination as to existence of a change in an image based on the transferred video signal. In this case, the image determination circuit C11 is composed of a memory for storing a plurality of image data, and a determination processing system for determining existence of a change in an image based on the data.

For the determination processing system, for example the following algorithm is used. First, for two image data stored in the memory, a difference between luminance signals is obtained for each pixel. Then, if a square sum thereof is equal to a predetermined value or higher, then existence of an image change is determined. If the square sum is lower than the predetermined value, then no image changes are determined. Regarding the algorithm for determining image changes, various algorithms other than the above are available.

If the image determination circuit C11 determines no image changes for over a predetermined period of time, then the output of the light source C1 is reduced to, for example half the usual output. Then, on a monitor C10, an image immediately before the output of the light source C1 is reduced is displayed as a still picture. In this case, image capturing carried out in the video signal processing system C9 is continued without displaying any images on the monitor C10 and, during this period, existence of image changes is constantly determined by the image determination circuit C11. Here, a video signal by a dimmed illumination light has a level enough for determining image changes by the image determination circuit C11.

If existence of an image change is determined, then the output of the light source C1 is immediately returned to the usual output. The video signal obtained by the conversion performed in the video signal processing system C9 is transferred to the image determination circuit C11 and the monitor C10. Then, the sample A is illuminated by the usual output, and a motion picture of the sample A is continuously displayed on the monitor C10.

Thus, according to the fifth embodiment, damage given to the sample A can be effectively reduced by preventing unnecessary irradiation of the sample A with an illumination light.

Furthermore, in the fifth embodiment, the illumination light reaching the sample A is dimmed by reducing the output of the light source C1. Instead, a light attenuator, e.g., a parallel flat plate having low transmittance, may be inserted in an optical path of an illumination light from the light source C1 to the stage C5, and by opening/closing this light attenuator, the illumination light may be dimmed. Other than such a light attenuator, various dimming methods are available: e.g., a method for rotating a polarizing plate or a wavelength plate by means of polarization, a method for performing dimming by electrically modulating a liquid crystal wavelength plate.

(Sixth Embodiment)

Figure 8:
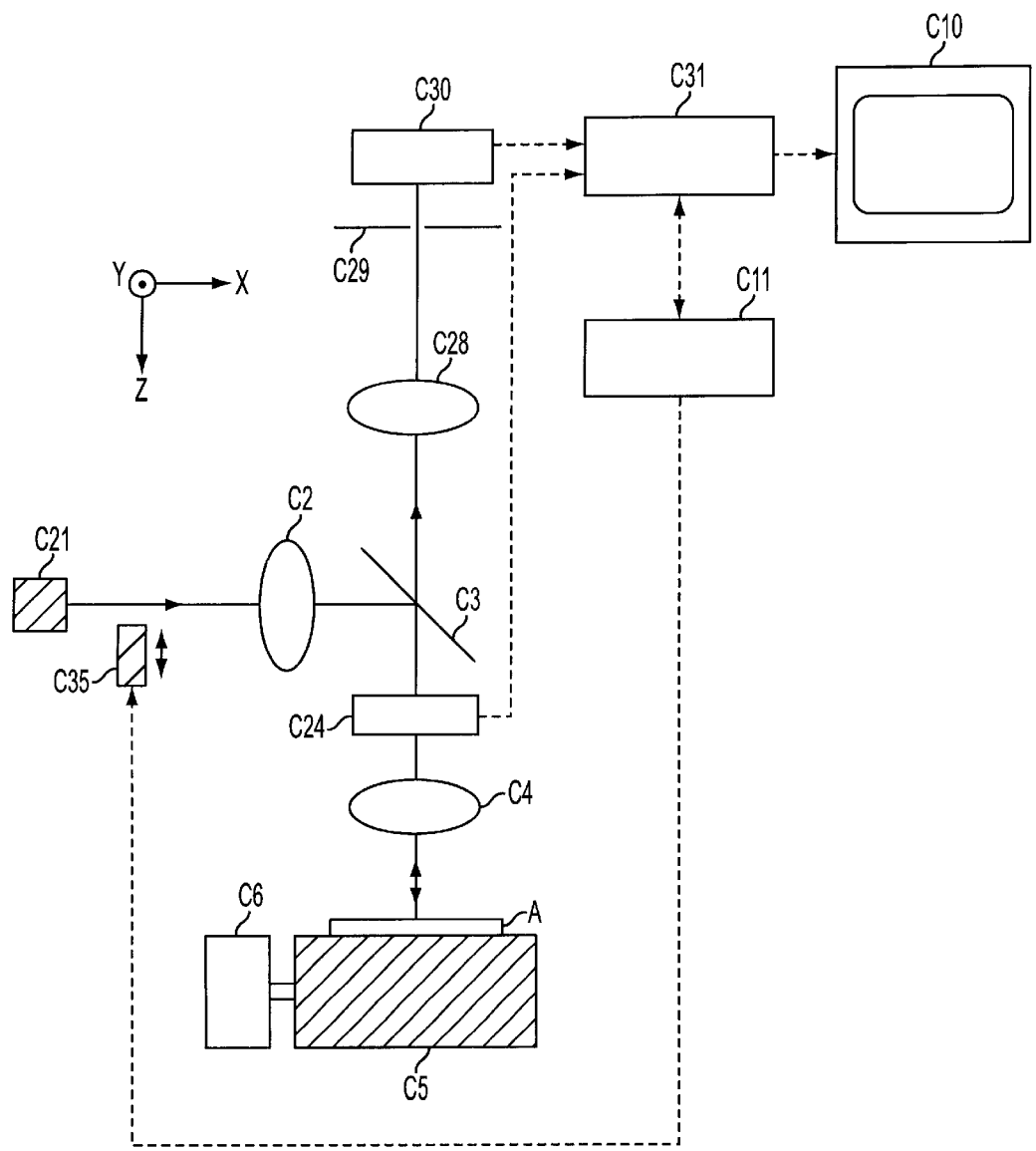
FIG. 8 is a schematic view showing a microscope of a sixth or eighth embodiment.

FIG. 8 shows a confocal laser-scanning microscope of a sixth embodiment.

An illumination light emitted from a laser light source C21 is transmitted through an illuminating lens C2, and made incident on a half mirror C3. The illumination light reflected by the half mirror C3 is transmitted through a two-dimensional light beam scanner C24 and an objective lens C4 to form a very small laser spot in the surface of a sample A placed on a stage C5.

An observed light reflected on the sample A is transmitted through the objective lens C4 and the two-dimensional light beam scanner C24, and made incident on the half mirror C3. After having passed through the half mirror C3, the observed light is transmitted through a collective lens C28 to form a spot again in pinhole C29. The observed light transmitted through the pinhole C29 is then made incident on a detector C30. The observed light made incident on the detector C30 is subjected to photoelectric conversion, and converted into a video signal together with a control signal from the two-dimensional light beam scanner C24 by a signal processing system C31.

As in the case of the fifth embodiment, in the sixth embodiment, the video signal obtained by the conversion performed in the signal processing system C31 is transferred to an image determination circuit C11. The image determination circuit C11 performs determination as to existence of an image change based on the transferred video signal.

If the image determination circuit C11 determines no image changes for over a predetermined period of time, a light attenuator C35 is moved into an optical path of an illumination light. Then, on a monitor C10, an image immediately before the illumination light is dimmed by the light attenuator C35 is displayed as a still picture. In this case, image capturing in the signal processing system C31 is continued without supplying any images to the monitor C10 and, during this period, existence of image changes are constantly determined by the image determination circuit C11. Here, the video signal by the dimmed illumination signal has a level enough for determination of image changes performed in the image determination circuit C11.

Then, if an image change is determined, the light attenuator C35 is immediately moved out of the optical path, and the video signal obtained by the conversion carried out in the signal processing system C31 is transferred to the image determination circuit C11 and the monitor C10. Then, the sample A is illuminated by a usual output, and a motion picture of the sample A is continuously displayed on the monitor C10.

Thus, in the sixth embodiment, as in the case of the fifth embodiment, damage given to the sample A can be effectively reduced by preventing unnecessary irradiation of the sample A with an illumination light. Also, in the sixth embodiment, with the use of the laser light source C21, a wavelength area thereof is short. If the wavelength are is shorter than a visible area, for example if the area is a short wavelength area from an ultraviolet ray area to a soft X ray area, it is especially important to reduce damage given to the sample by preventing unnecessary irradiation of the same with an illumination light.

The embodiment has been described with particular reference to the microscope of a reflected illumination type. But the present invention can be applied to a microscope of a transmission illumination type.

Furthermore, the microscope of the embodiment can be used as a measuring device for measuring the sample A on the monitor C10.

(Seventh Embodiment)

Next, description will be made of a microscope according to a seventh embodiment of the present invention. The microscope of the seventh embodiment is a modified example of the microscope of the fifth embodiment, and structural features in the drawing are the same as those shown in FIG. 7. Thus, the microscope will be described with reference to FIG. 7.

The microscope of the seventh embodiment takes two states: a continuous image capturing state, and an intermittent image capturing state.

In the continuous image capturing state, an output signal from an image sensor C8 is converted into a video signal by a video signal processing system C9, and then made incident on a monitor C10. Accordingly, in the continuous image capturing state, a sample A is continuously illuminated, and a motion picture of the sample A is displayed on a monitor Then, the vide signal obtained by the conversion carried out in the video signal processing system C9 is transferred to an image determination circuit C11. The image determination circuit C11 performs determination as to existence of an image change based on the transferred video signal.

On the other hand, in the intermittent image capturing state, illumination for the sample A and image capturing are performed at every constant interval of time. In other words, periodic switching ON/OFF of a power source for the light source C1 is performed, and image capturing is performed accordingly. The video signal at this time is transferred to the image determination circuit C11, and determination is made as to existence of an image change.

In the continuous image capturing state, if the image determination circuit C11 determines no image changes for over a predetermined period of time, the power source for the light source C1 is switched OFF temporarily, and the video signal processing system C9 interrupts its image capturing operation. Then, on the monitor C10, an image immediately before the power source for the light source C1 is switched OFF is displayed as a still picture. Subsequently, the process proceeds to the intermittent image capturing state. In the intermittent image capturing state, if the image determination circuit C11 determines existence of an image change, the power source for the light source C1 is immediately switched ON, and then the process returns to the continuous image capturing state.

As described above, according to the seventh embodiment, damage given to the sample A can be effectively reduced by preventing unnecessary irradiation of the same with an illumination light.

In the seventh embodiment, illuminance reaching the sample A is reduced by switching ON/OFF the output of the light source C1. Instead, the output of the light source C1 is reduced, for example to 10% or lower. Also, a shutter may be inserted into an optical path of an illumination light from the light source C1 to the stage C5 and, by opening/closing this shutter, an illumination light may be cut off/released. In this case, illuminance must be reduced to a certain extent even if the illumination light cannot be completely cut off. For example, the shutter may be one, which is capable of reducing illuminance of the illumination light to 10% or lower.

(Eighth Embodiment)

Next, description will be made of a microscope according to an eighth embodiment of the present invention. The microscope of the eighth embodiment is a modified example of the microscope of the sixth embodiment, and structural features in the drawing are the same as those shown in FIG. 8. Thus, the microscope will be described with reference to FIG. 8.

The microscope of the embodiment takes two states: a continuous image capturing state, and an intermittent image capturing state.

As in the case of the seventh embodiment, in the eighth embodiment, a video signal obtained by conversion carried out by a signal processing system C31 is transferred to an image determination circuit C11. The image determination circuit C11 performs determination as to existence of an image change based on the transferred video signal.

If the image determination circuit C11 determines no image changes for over a predetermined period of time, a shutter C35 is temporarily moved into an optical path of an illumination light, and the signal processing system C31 interrupts its image capturing operation. Then, on a monitor C10, an image immediately before the shutter C35 cuts off the illumination light is displayed as a still picture. Subsequently, the process proceeds to the intermittent image capturing state for performing illumination for a sample A and image capturing at every constant interval of time. In other words, a periodic movement of the shutter C35 into and out of the optical path of the illumination light is repeated, and image capturing is performed accordingly. A video signal at this time is transferred to the image determination circuit C11, and determination is made as to existence of an image change. If existence of an image change is determined, the shutter C35 is immediately moved out of the optical path, and the process returns to the continuous image capturing state.

As in the case of the seventh embodiment, in the eighth embodiment, damage given to a sample A can be effectively reduced by preventing unnecessary irradiation of the same with an illumination light. Also, in the eighth embodiment, with the use of a light source C21, a wavelength area thereof is short. If the wavelength area is shorter than a visible area, for example if the area has a short wavelength selected from an ultraviolet ray area to a soft X ray area, it is especially important to reduce damage given to the sample by preventing unnecessary irradiation of the same with an illumination light.

The embodiment has been described with particular reference to the microscope of a reflected illumination type. But the present invention can also be applied to a microscope of a transmission illumination type.

Furthermore, the microscope of the embodiment can be used as a measuring device for measuring the sample A on the monitor C10.

What is claimed is:

1. A microscope comprising:

a light source;

an illumination optical system that irradiates a sample with an illumination light emitted from the light source;

a stage that places the sample;

an image-forming optical system that collects an observed light exiting from the sample;

a detector that detects the observed light passing through the image-forming optical system;

a processing unit that processes a signal from the detector;

a display that displays an image of the sample based on a video signal from the processing unit;

an illuminance reducing unit that reduces illuminance of the illumination light on the sample to be lower than a specified value which is enough for observation by the display;

a control unit that controls an operation of the illuminance reducing unit; and a stage driving system that drives the stage, wherein said control unit makes the illuminance reducing unit operative according to a moving velocity of the stage by the stage driving system, and reduces illuminance of the illumination light on the sample to be lower than the specified value which is enough for displaying an image of the sample on the display, and said display displays an image of the sample as a still picture, the image being one when the illuminance reducing unit was in an inoperative state immediately before an operative state, while the illuminance reducing unit is in the operative state.

2. A microscope according to claim 1, wherein said illuminance reducing unit adjusts an output of the light source.

3. A microscope according to claim 1, wherein said illuminance reducing unit includes one selected from a shutter and a dimming plate, which are disposed in an optical path of the illumination light so as to be freely detached.

4. A microscope according to claim 1, wherein said light source is a coherent light source, said illumination optical system includes a scanner that converges the illumination light on the sample and that two-dimensionally scans the converged illumination light in a facial direction of the sample, and said processing unit processes a signal from the detector and a signal from the scanner.

5. A microscope according to claim 4, wherein the microscope is a confocal laser-scanning microscope.

6. A microscope according to claim 1, wherein a wavelength of the light source is shorter than that of a visible area.

7. A microscope comprising:

a light source;

an illumination optical system that irradiates a sample with an illumination light emitted from the light source;

a stage that places the sample;

a stage driving system that drives the stage;

an image-forming optical system that collects an observed light exiting from the sample;

a detector that detects the observed light passing through the image-forming optical system;

a processing unit that processes a signal from the detector;

a monitor that displays an image of the sample based on a video signal from the processing unit;

an illuminance reducing unit that reduces illuminance of the illumination light on the sample; and a control unit that controls the illuminance reducing unit according to a velocity of the stage to change a value $\alpha$ representing an amount of illuminance reduction, and controls the processing unit to display a still picture of the sample on the monitor in a time width $T_N$, the still picture being one before starting of the time width $T_N$, assuming that a time width where the illuminance is at a level enough for displaying an image of the sample is $T_F$, a time width where the illuminance is at a level lower than that enough for displaying an image of the sample is $T_N$, and value $\alpha$ is as follows:

$$\alpha = T_F(T_F + T_N).$$

8. A microscope according to claim 7, wherein said illuminance reducing unit sets the value $\alpha$ to 0 while the stage is stopped, and to 1 while the stage is on the move.

9. A microscope according to claim 7, further comprising: a displacement sensor that detects a position of the stage, wherein said control unit obtains a velocity of the stage based on a signal from the displacement sensor.

10. A microscope according to claim 7, wherein said stage driving system includes a driving motor, and said control unit obtains a velocity of the stage based on a signal from the driving motor.

11. A microscope according to claim 7, wherein said illuminance reducing unit adjusts an output of the light source.

12. A microscope according to claim 7, wherein said illuminance reducing unit includes one selected from a shutter and a dimming plate, which are disposed in an optical path of the illumination light so as to be freely detached.

13. A microscope according to claim 7, wherein said light source is a coherent light source, said illumination optical system includes a scanner that converges the illumination light on the sample and that two-dimensionally scans the converged illumination light in a facial direction of the sample, and said processing unit processes a signal from the detector and a signal from the scanner.

14. A microscope according to claim 13, wherein the microscope is a confocal laser-scanning microscope.

15. A microscope according to claim 7, wherein a wavelength of the light source is shorter than that of a visible area.

16. A microscope comprising:

an illumination optical system for irradiating a sample with an illumination light emitted from a light source;

stage driving means for driving a stage for placing the sample;

an image-forming optical system for collecting an observed light exiting from the sample;

displaying means for displaying an image of the sample, which is obtained by detecting the observed light passing through the image-forming optical system;

illuminance reducing means for reducing illuminance of the illumination light on the sample; and control means for controlling the illuminance reducing means according to a velocity of the stage to change a value $\alpha$ representing an amount of illuminance reduction, and displays a still picture of the sample on the displaying means for a period of a time width $T_N$, the still picture being one before starting of the time width $T_N$, assuming that a time width where the illuminance is at a level enough for displaying an image of the sample is $T_F$, a time width where the illuminance is at a level lower than that enough for displaying the image of the sample is $T_N$, and the value $\alpha$ is as follows:

$$\alpha = T_F(T_F + T_N).$$

* * * * *